Feb. 15, 1938.   H. E. TAUTZ   2,108,086
EXTENSION CONTROL MEANS FOR TOOL GUIDES
Filed May 27, 1935   3 Sheets-Sheet 3

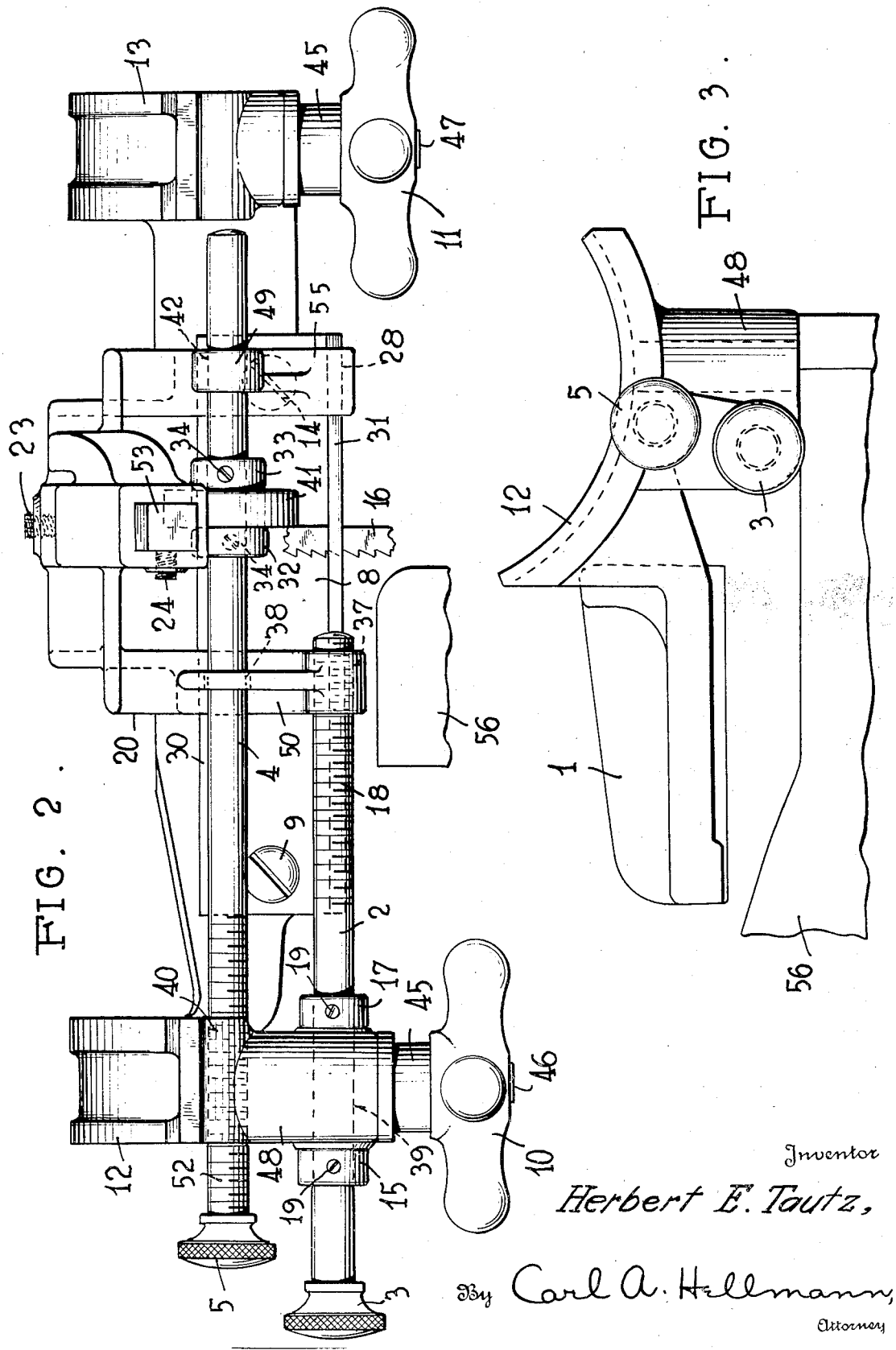

Inventor
Herbert E. Tautz,
By Carl A. Hellmann,
Attorney

Patented Feb. 15, 1938

2,108,086

UNITED STATES PATENT OFFICE 2,108,086

EXTENSION CONTROL MEANS FOR TOOL GUIDES

Herbert E. Tautz, Milwaukee, Wis., assignor to Delta Manufacturing Company, Milwaukee, Wis.

Application May 27, 1935, Serial No. 23,759

4 Claims. (Cl. 143—160)

The present invention relates to means for controlling machine parts ordinarily difficult of access by means of extension devices terminating at convenient points adjacent the machine table or the like, thus increasing the ease and safety of making certain adjustments.

More specifically, it relates to means for controlling the lower saw guide in a band saw, particularly one of the type disclosed in my prior Patent No. 2,032,233, dated February 25, 1936, for Band saw guides.

In the band saw disclosed in said prior case the lower saw guide, which is located under the table in the customary manner, is, of course, not so readily accessible as the upper saw guide and this may lead to difficulty or even danger of injury in the hands of inexperienced users, who in groping beneath the saw table might accidentally come in contact with moving parts.

The underlying idea of the present invention consists in providing operating rods extending forward from the lower saw guide, that is, toward the operator of the machine, and of sufficient length to provide convenient access from the front of the table.

Still more specifically, the invention consists in a slidable saw guide mounted upon a suitable way or ways, and having an operating means extending forwardly therefrom for moving such guide along said ways, said saw guide being provided further with a second operating means for making possible a further additional type of adjustment of the saw guide.

Other objects and advantages of the present invention will in part be specifically set forth in the present specification and partly will be obvious from the disclosure.

Figure 1:
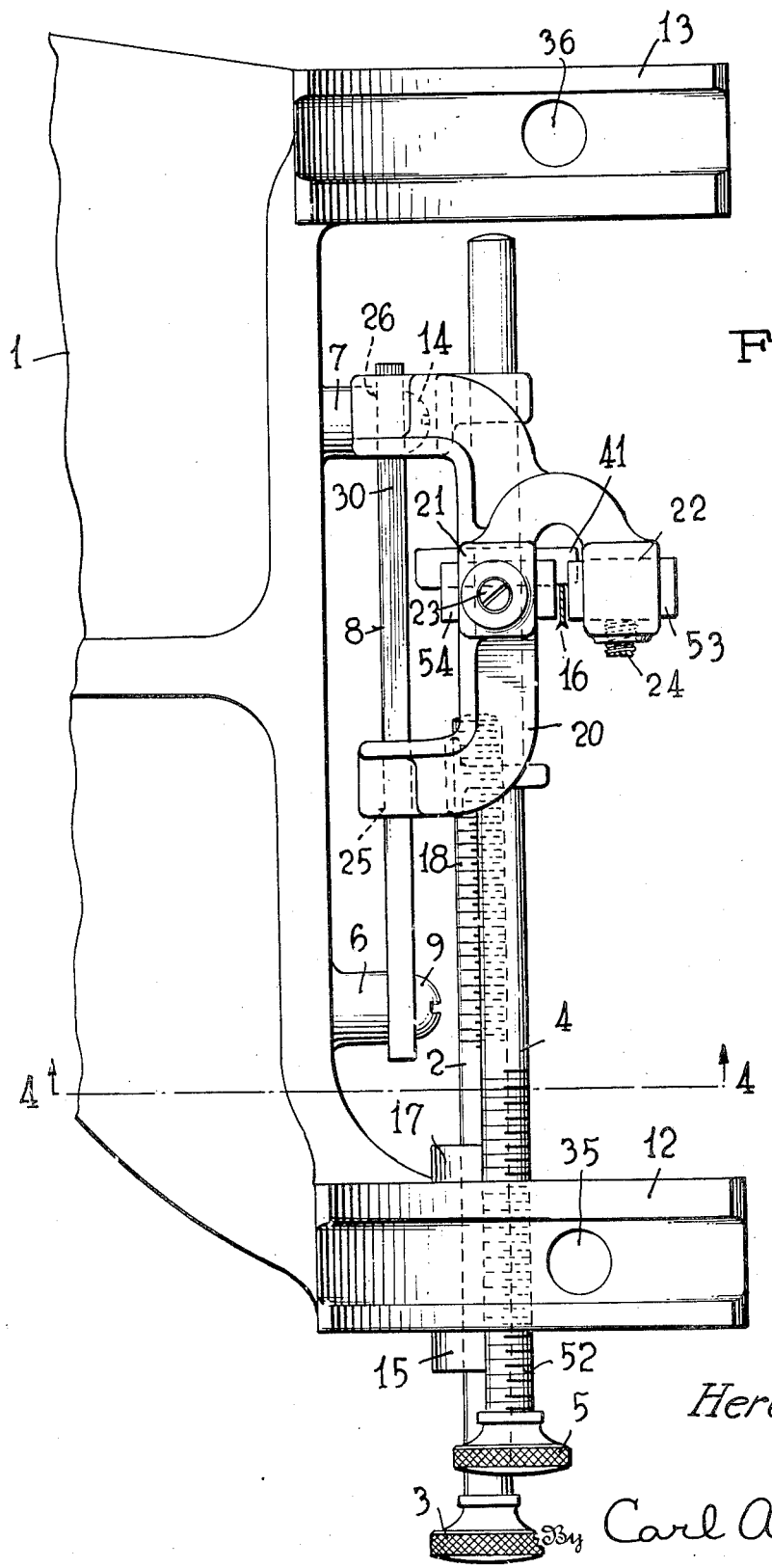
Figure 4:
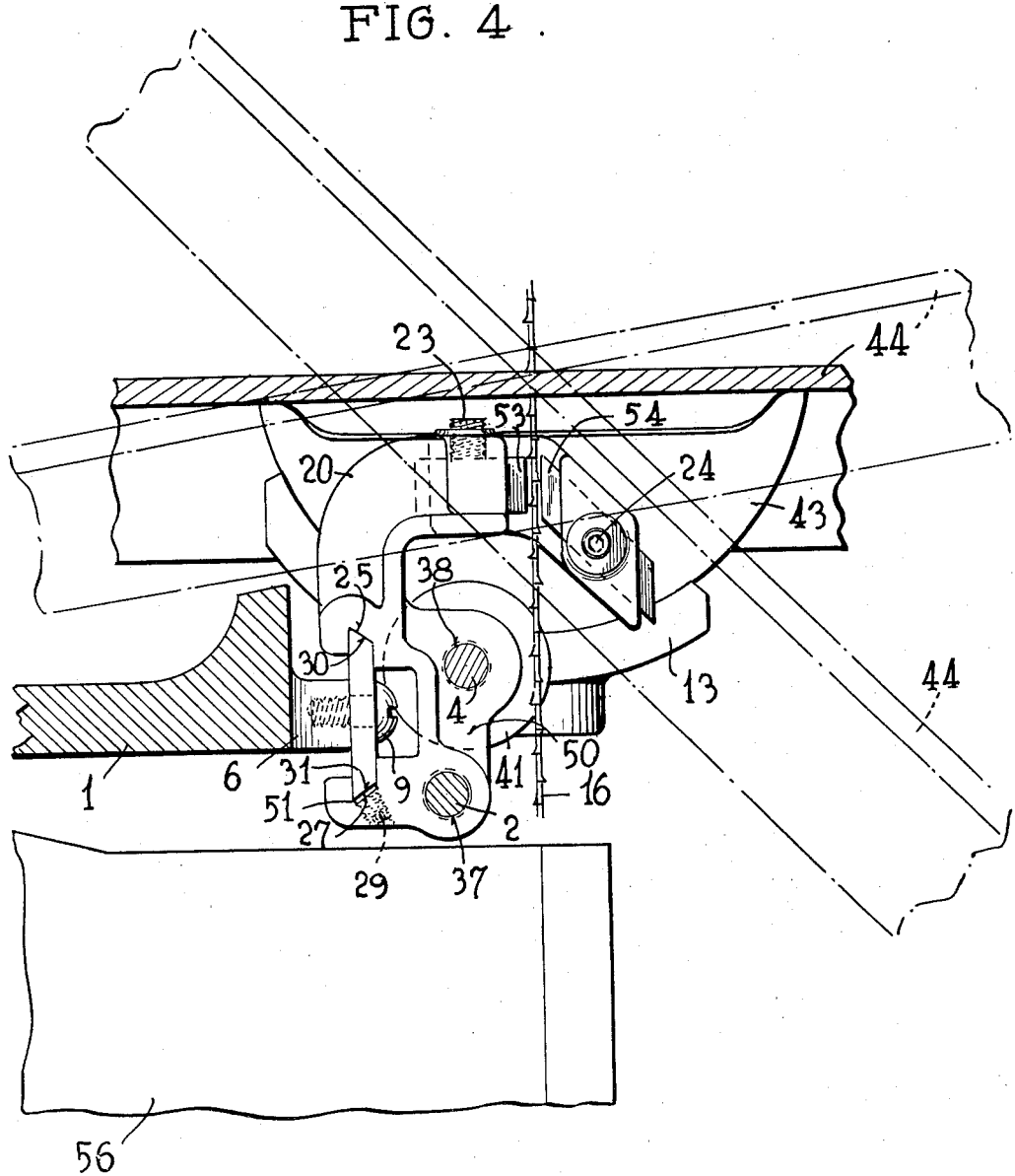

One embodiment of the invention is described in said specification and illustrated in the accompanying drawings wherein:

Fig. 1 is a plan view of a portion of a table support for a band saw, the table itself being omitted, and showing the saw guide and certain associated parts, Fig. 2 is a side elevation of the structure illustrated in Fig. 1, Fig. 3 is a front elevation corresponding to Fig. 1, certain parts being omitted, and Fig. 4 is a vertical sectional elevation on the plane indicated by the line 4—4 of Fig. 1.

In all the figures corresponding parts are indicated by similar reference characters.

Referring first to Fig. 1, 56 is a base having a frame or bracket 1 for supporting the table 44 (Fig. 4) of a band saw or the like by means of trunnions such as 43. The frame 1 is provided with lugs or bosses 6 and 7 which support a slide plate 8 provided with an upper inclined surface 30 and a lower inclined surface 31, shown best in Fig. 4. This plate may be secured to the lugs 6 and 7 in any convenient way, for example, by means of the screws 9 and 14.

A front star wheel 10 and a rear star wheel 11, bearing against bosses 45 arranged below the lower surface of the bracket 1, cooperate with the front arcuate bearing 12 and the rear arcuate bearing 13 and with clamping screws 46 and 47 passing through holes 35 and 36 in said bearings, to secure the trunnions 43 in adjusted positions, this feature, however, forming no part of the present invention and being disclosed and specifically claimed in my Patent No. 2,040,718, dated May 12, 1936, for Trunnions.

It will suffice for the understanding of the present disclosure to state that the star wheels 10 and 11 provide means for permitting tilting adjustment of the table and for clamping the same when so adjusted.

A carriage 20 is arranged to slide forward and back on the plate 8 and this carriage carries the side thrust bearings or saw guides 53 and 54 arranged upon the right and left respectively of the band saw blade 16. These saw guides 53 and 54 are slidable in the respective holders 22 and 21 and when adjusted may be clamped in said holders by means of the respective clamping screws or set screws 24 and 23. These may be of the slotted head type or hollow head type as preferred, both kinds being shown for purposes of disclosure.

The carriage 20 as a whole may be adjusted forward or backward by means of the operating rod 2, which passes freely through a bore 39 in the front bearing member 48 so that it may rotate therein. Collars 15 and 17, respectively in front of and in back of said member 48, may be secured to the rod 2 by screws 19 or the like, so that the rod 2 may rotate freely in bore 39, but will be restrained from longitudinal movement. Upon loosening the screws 19, the collars 15 and 17 may slide freely on the rod 2 to permit longitudinal adjustment of said rod when desired.

The carriage 20 has a front depending arm 50 which is threaded at 37 to receive the correspondingly threaded end 18 of the rod 2. The rod 2 carries an operating knob 3 or the like whereby it may be turned, thereby adjusting the position of the carriage 20 in a forward or backward direction.

The carriage 20 is provided with an upper front angular slot 25 and an upper rear angular slot 26, both of which cooperate with the inclined upper surface 30 of the plate 8 to provide an upper guide for the said carriage, while lower angular slots 27 and 28, at the front and rear of said carriage, provide a corresponding lower guide for the carriage, a gib 51 being preferably inserted in one of the lower angular slots, for example, slot 27, and a screw 29 cooperating therewith to tighten said gib so as to adjust the ease of sliding of the carriage 20 along the slide plate 8, or even to clamp the carriage rigidly in place if desired.

The mechanism thus far described provides means for adjusting the carriage 20 forward or backward so that the ultimate result is attained that the right and left saw guides 53 and 54 may be moved jointly forward or backward to accommodate saw blades of various sizes, while maintaining proper alinement with the saw blade.

The mechanism for adjusting the backward-thrust bearing for the saw blade will now be described. It consists of an operating rod 4 having a threaded portion 52 engaged in a correspondingly threaded bore 40 in member 48, said rod having an operating knob 5 or the like at its forward end. An aperture 38 may be provided in the front depending arm 50 of the carriage 20, said rod passing freely through such aperture, and a bore 42 is preferably provided in the rear depending arm 55 of the carriage 20 having preferably a boss 49 with the bore 42 fitting fairly closely on the rod 4 so as to permit free rotation and sliding of said rod, but to prevent any appreciable lateral play thereof.

A ball-thrust bearing having a rotatable portion 41, for supporting the backward thrust of the saw blade 16, is held on the rod 4 by means of the front collar 32 and the rear collar 33, held adjustably to the rod 4 by the screws 34, so that the freely rotatable portion 41 will bear the thrust of the saw blade 16.

The operation of the present device will readily be understood from the structure thereof and may be briefly summarized as follows:

Assuming that a saw blade 16 has been inserted in the band saw and that the various guides are to be adjusted to cooperate therewith, three operations are necessary.

First, the guides 53 and 54 should be adjusted laterally to provide the proper alinement and clearance on both sides of the blade 16, but nevertheless to prevent any undue twisting of said blade, and this is accomplished by loosening the screws 23 and 24 and pushing the guide blocks 53 and 54 toward or from the blade 16 until they reach the proper positions. Inasmuch as most band saw blades for use with a particular band saw are of approximately equal thickness this first-named adjustment need very seldom be disturbed except to take up wear, and hence no extension means for ready access, at the front of the table, to the screws 23 and 24 beneath the table, need ordinarily be provided.

The second adjustment may be that of moving the rear thrust bearing 41 forward or backward until its front surface cooperates correctly with the rear edge of the saw blade 16, to support the same against backward yield. This may be accomplished very easily by manipulating the rod 4 by means of the operating knob 5, whereupon said rod, on turning in the screw-threaded bore 40, will move forward or backward carrying the ball-bearing 41 with it until the proper adjusted position for the width of the saw blade in use is reached.

The screw threads at 52 and 40 will preferably be made sufficiently close-fitting to prevent the rod 4 from turning spontaneously due to vibration or the like, so that no locking means need be provided to retain the rod 4 in its adjusted position. While it would be very simple to provide a lock nut on the screw threads 52, bearing against the member 48, this would merely add another adjustment which would have to be manipulated and it is, therefore, considered to be an advantage to rely on threads which fit tightly enough to make such lock nut unnecessary.

In order to have the knob 5 at the proper position to be available to the operator standing in front of the band saw, the slidable collars 32 and 33 are provided, so that a single rod 4 may be made to serve tables of various widths by clamping said collars at appropriate spots on the rod 4 to correspond to the dimensions of the saw table. This feature leads to economy in manufacture since parts of one size will fit machines having tables of various sizes.

Having adjusted the thrust bearing 41 into proper position to support the rear edge of the saw blade 16, the final adjustment will be to move the carriage 20 forward or backward until the saw guides 53 and 54 will support the entire width of the saw blade, exclusive of the serrated or toothed edge thereof, in the customary manner. This is accomplished very readily by manipulating the rod 2 by means of its knob 3. Inasmuch as this rod 2 is secured against axial shift by means of the collars 16 and 17, it is obvious that the carriage 20 will be moved forward or backward by reason of the engaging threads 18 and 37 when the knob 3 is rotated. Like the rod 4, the rod 2 is also adjustable for tables of different sizes, this adjustment being accomplished by shifting the collars 16 and 17 and clamping them where desired by means of the screws 19.

While the rod 2 has been illustrated as non-shiftable in an axial direction, whereas the rod 4 is shiftable axially, it is clear that if preferred these conditions could be reversed or both rods could be even made alike, and this is merely a matter of preference and design. However, in the particular device illustrated certain advantages of simplicity are secured by providing axial shift in the rod 4, while preventing it in the rod 2.

This device differs from those at present in general use in that heretofore the adjustments under the table were necessarily made by placing the hands of the operator under said table adjacent to the saw guides and if this operation were attempted by a careless or inexperienced operator, while the saw was in action, it is, of course, clear that accidents could readily occur. The present device, however, permits adjusting the parts even while the device is in operation, although, of course, it is not recommended that this be done. However, it will to this extent serve as a safety device, and, moreover, will afford very great convenience to the operator by bringing the controls forward to positions where they can be reached readily.

A companion case, Serial No. 112,410, filed November 3, 1936, which has certain features in common with the present case, contains claims directed to the feature of having the lower guide for the band saw blade as closely adjacent to the under surface of the tilting table as possible, this result being obtained by the angular arrangement of the lateral guides with respect to one another shown best in Fig. 4 of the present case. The present case is restricted to claims on the feature of providing extension control means for the said lower thrust bearing, at an accessible position near the front of the table and this, therefore, constitutes a line of division or differentiation between the said two cases.

While a specific embodiment of the extension shifting means for the saw blade guides has been disclosed and described in detail in the present case it is, of course, to be understood that many changes and modifications can be made in the various parts thereof without departing from the spirit of the invention.

Hence the scope of the present invention is not to be considered limited to the precise form illustrated and described herein, but on the contrary is defined solely by the appended claims.

I claim:

1. Extension adjustment-operating means for a band sawing machine comprising a track supported by the said machine, a carriage mounted movably on said track, a saw-blade lateral guide member supported by said carriage, forwardly extending means for moving the carriage along said track, a thrust-receiving rear guide member for the saw-blade, and independent forwardly extending means for moving said second guide member in a direction parallel to the movement of the carriage but independently thereof.

2. Extension adjustment-operating means for a band sawing machine having a table, comprising a track supported by the said machine, a carriage mounted movably on said track, a saw-blade lateral guide member supported by said carriage in a relatively inaccessible location beneath the table, means for moving the carriage along said track, said means comprising a member extending to a readily accessible location near the front of the table, a thrust-receiving rear guide member for the saw-blade, and independent means for moving said second guide member in a direction parallel to the movement of the carriage but independently thereof.

3. Extension adjustment-operating means for a band sawing machine having a table, comprising a track supported by the said machine, a carriage mounted movably on said track, a saw-blade lateral guide member supported by said carriage in a relatively inaccessible location beneath the table, means for moving the carriage along said track, said means comprising a member extending to a readily accessible location near the front of the table, a thrust-receiving rear guide member for the saw-blade, and independent means also comprising a member extending to a readily accessible location near the front of the table, for moving said second guide member in a direction parallel to the movement of the carriage but independently thereof.

4. Extension adjustment-operating means for a band sawing machine having a table and having a thrust bearing supporting the rear edge of the saw blade, said thrust bearing being located in a relatively inaccessible location below the table of the machine, said extension adjustment-operating means comprising a rod extending to a readily accessible location near the front of the table, means at said location for moving said rod longitudinally, and independent means on said rod for shifting said thrust bearing into proper position to cooperate with the saw blade for tables of various sizes.

HERBERT E. TAUTZ.